Figure 1:
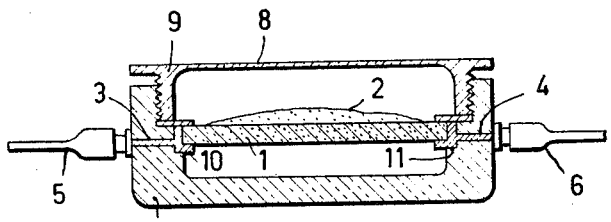

INVENTOR.
RAYMOND G. SCHAYES
BY
Frank R. Dufari
AGENT

[Header info]

3,283,150
DOSIMETER FOR X-RAYS AND GAMMA RAYS
Raymond Georges Schayes, Forest-Brussels, Belgium, assignor to Manufacture Belge de Lampes et de Materiel Electronique, S.A., M.B.L.E., Brussels, Belgium
Filed Nov. 29, 1963, Ser. No. 326,820
Claims priority, application Belgium, Nov. 29, 1962, 500,120, Patent 625,461
10 Claims. (Cl. 250—71)

Measurements of dosage of radiation, for example of X-rays and gamma rays, may be performed with the aid of thermo-luminescent dosimeters the active element of which consists of a fluorescent material which on irradiation absorbs energy and which dosimeters are read on termination of the irradiation by heating the fluorescent material to fluorescence. The emission of light does not take place throughout the entire range of the increase in temperature but only at a few distinct temperature values. There is an extensive literature in which the said properties are discussed, so that we need not go into details here.

Heating of the fluorescent material is effected most appropriately by supplying heat to a support coated with a thin layer of sensitive material. The support may be a member of electric resistance material included in an electric circuit. When the support is made of metal or insulating material, the heat may be transferred by radiation from a heater which is heated to a suitable temperature by means of an electric current. The aforementioned devices have a limitation in that the heat generation causes the temperature to rise more quickly at the center than at the edges. To heat all the parts of the active element to the temperature range required for the production of the fluorescence calls for a greater amount of heat and the center portion of the active substance, which is less exposed to heat dissipation than the edge portions, will be heated to an unnecessarily high temperature.

During the increase in temperature, luminescence is produced having prominent maximum values at a few specific temperatures while on either side of these temperatures the luminescence decreases over a comparatively slight temperature range. The amount of light is measured and is a measure of the absorbed radiation energy. Preferably, the maximum luminous intensity is determined, because the measuring equipment required is simpler and the measurements may be more accurate since the intensity of part of the total amount of light is so slight as to prevent the measuring apparatus from recording it with certainty.

In radiation measurements utilizing the maximum intensity of the fluorescence, an incorrect indication is obtained when the temperature of the surface of the active substance is not the same throughout. In this case, the temperature at which the intensity of the fluorescence is a maximum, is reached by different portions of the surface at successive instants and the luminous intensity curve is levelled. The total maximum is smaller than if at every point of the surface the temperature is the same at any instant.

The invention relates to an improvement of thermo-luminescent dosimeters, which provides that during the supply of heat to an active material the surface temperature throughout the entire surface is the same at any instant. According to the invention, the length of the shortest path by which the heat reaches the surface of the thermo-luminescent layer by conduction, increases from the edges to the center of the surface.

For the similar problem of uniform heating of indirectly heated cathodes in thermionic discharge tubes solutions are known which are distinguished from the invention in that the heat radiation per unit of length of the heater is greater at the ends than at the center. Manufacture of such heaters is more expensive than that of a heater having the same radiation capacity per unit of length.

In an advantageous embodiment of a thermo-luminescent dosimeter the thermo-luminescent material is provided on a hollow cylindrical support, the electric heater being arranged in the interior of the support. The desired result is obtained by providing the thermo-luminescent material not as a layer of uniform thickness, but as a layer the thickness of which increases from the ends towards the center. A construction which also fulfills the purpose, employs a hollow cylindrical support the wall thickness of which increases from the ends towards the center. In this embodiment, the luminescent material is provided as a layer of uniform thickness.

Figure 2:
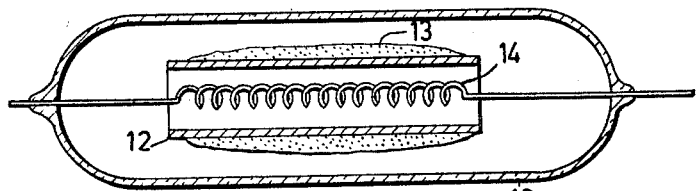
Figure 3:
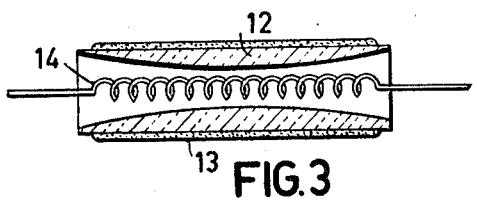

In order that the invention may be readily carried into effect, embodiments thereof will now be described, by way of example, with reference to the accompanying diagrammatic drawings, in which:

FIG. 1 is a longitudinal sectional view of a plate-shaped thermo-luminescent dosimeter provided with an electrically heated support, FIG. 2 is a longitudinal sectional view of a thermo-luminescent dosimeter of cylindrical shape provided with a support heated by radiation of heat, and FIG. 3 is a longitudinal sectional view of a modified embodiment of a cylindrical thermo-luminescent dosimeter.

Referring now to FIG. 1, the active portion of the dosimeter is a circular thin disc 1 one side of which is covered by a layer 2 of thermo-luminescent material. It is known that calcium fluoride has properties suitable for dosimetry by means of thermo-luminescence. The thickness of the layer of thermo-luminescent material generally is about 150 microns. The thickness of the layer is not restricted within accurate limits, and the minimum layer thickness may be defined as the thickness at which the light produced in the particles of the materials situated at the greatest depth just reaches the surface. Hence, if the thickness of the layer decreases towards the edges, as is shown in the figure, it must be ensured that the thickness along the edges is not less than the minimum value. Experiments have shown that a maximum thickness of 150 microns and a minimum thickness along the edges of 90 microns provide a uniform temperature throughout the entire surface at each instant of the heating process.

The support 1 of the radiation-sensitive material is made of electric resistance material, for example, graphite or carbon, and is provided with terminals 3 and 4 for connection to supply leads 5 and 6 for the electric current.

The radiation-sensitive part of the dosimeter is disposed in an envelope 7–9 of heat-resistant insulating material, for example, ceramic material, glass or a thermohardening synthetic resin. Metal, for example, aluminum, may also be used, provided that the radiation to be measured is absorbed to a slight degree only and a window 8 is provided for the passage of the fluorescent light. The envelope is made of two portions 7 and 9, which are clamped together and between which the edge of the support of the thermo-luminescent material is clamped in metal channels 10 and 11. The envelope may be hermetically sealed so that the inner space may be gas-filled or exhausted to a low pressure.

The dosimeter of FIG. 2 has a cylindrical support 12. This generally is a tube of nickel but it may be a tube of ceramic material. The outer surface is covered with thermo-luminescent material 13 in the form of a layer the thickness of which decreases from the center towards the ends. A heater 14 is in the form of a helix of thin wire of constant pitch. Consequently, wire which is mechanically coiled into a helix may be cut into the required lengths to be used as heaters, because in using such a heater any lack of uniformity of heating the surface of the active element is compensated for by the differences in distance of the shortest path by which the heat reaches the surface by conduction.

In the dosimeter of FIG. 3, these differences in distance are produced by the increase in the thickness of the wall of a support 15 from the ends towards the center. Such a support must be made of ceramic material or at least of a material having a considerable thermal resistance. In a support of metal this step has no effect.

Similarly to the dosimeter of FIG. 1, the active part may be sealed in an envelope 16 consisting preferably of glass.

What is claimed is:

1. A dosimeter for X-rays and gamma rays comprising a support, a material on said support which upon irradiation by X-rays and gamma rays absorbs radiation energy and which upon termination of the irradiation and upon heating fluoresces, and means to heat said support and thereby heat the surface of said material by conduction through said material and said support, the path of heat conduction to the surface of said material increasing in length from the edges toward the center of the surface.

2. A dosimeter for X-rays and gamma rays comprising a support of uniform thickness, a layer of material on said support which upon irradiation by X-rays and gamma rays absorbs radiation energy and which upon termination of the irradiation and upon heating fluoresces, and means to heat said support and thereby heat the surface of said material by conduction through said material and said support, the thickness of said material layer increasing from the edges toward the center thereof.

3. A dosimeter for X-rays and gamma rays comprising a support, a material on said support which upon irradiation by X-rays and gamma rays absorbs radiation energy and which upon termination of the irradiation and upon heating fluoresces, and means to heat said support by radiation and thereby heat the surface of said material by conduction through said material and said support, the path of heat conduction to the surface of said material increasing in length from the edges toward the center of the surface.

4. A dosimeter for X-rays and gamma rays comprising a thermally resistive support, a material on said support which upon irradiation by X-rays and gamma rays absorbs radiation energy and which upon termination of the irradiation and upon heating fluoresces, and means to heat said support and thereby heat the surface of said material by conduction through said material and said support, said support increasing in thickness from the edges toward the center thereof.

5. A dosimeter for X-rays and gamma rays comprising a hollow cylindrical support, a layer of material on said support which upon irradiation by X-rays and gamma rays absorbs radiation energy and which upon termination of the irradiation and upon heating fluoresces, and means to heat said support and thereby heat the surface of said material by conduction through said material and said support, the thickness of said material layer increasing from the edges toward the center thereof.

6. A dosimeter for X-rays and gamma rays comprising a hollow cylindrical support, a layer of material on the outer surface of said support which upon irradiation by X-rays and gamma rays absorbs radiation energy and which upon termination of the irradiation and upon heating fluoresces, and means to heat said support by radiation and thereby heat the surface of said material by conduction through said material and said support, the thickness of said layer at the center thereof being about 150 microns and decreasing towards the edges thereof to a thickness of about 90 microns.

7. A dosimeter for X-rays and gamma rays comprising a support, a layer of material on said support which upon irradiation by X-rays and gamma rays absorbs radiation energy and which upon termination of the irradiation and upon heating fluoresces, means to heat said support and thereby heat the surface of said material by conduction to the surface of said material through said material and said support, the path of heat conduction increasing in length from the edges toward the center of the surface, and an envelope surrounding said support and said material, said envelope being transparent to fluorescent light, X-rays and gamma rays.

8. A dosimeter for X-rays and gamma rays comprising a hollow cylindrical support, a layer of material on the outer surface of said support which upon irradiation by X-rays and gamma rays absorbs radiation energy and which upon termination of the irradiation and upon heating fluoresces, means within said support to heat said support by radiation and thereby heat the surface of said material by conduction through said material and said support, the thickness of said material layer increasing from the edges toward the center thereof, and a hermetically sealed evacuated envelope surrounding said support and said layer, said envelope being transparent to fluorescent light, X-rays and gamma rays.

9. A dosimeter for X-rays and gamma rays comprising a hollow cylindrical support, a layer of material on the outer surface of said support which upon irradiation by X-rays and gamma rays absorbs radiation energy and which upon termination of the irradiation and upon heating fluoresces, means within said support to heat said support and thereby heat the surface of said material by conduction through said material and said support, the thickness of said support increasing from the edges toward the center thereof, and a hermetically sealed gas-filled envelope surrounding said support and said layer, said envelope being transparent to fluorescent light, X-rays and gamma rays.

10. A dosimeter for X-rays and gamma rays comprising a hollow cylindrical support, a layer of material on the outer surface of said support which upon irradiation by X-rays and gamma rays absorbs radiation energy and which upon termination of the irradiation and upon heating fluoresces, means within said support to heat said support by radiation and thereby heat the surface of said material by conduction through said material and said support, the thickness of said support increasing from the ends toward the center thereof, and a hermetically sealed envelope surrounding said support and said layer, said envelope being transparent to fluorescent light, X-rays and gamma rays.

References Cited by the Examiner

FOREIGN PATENTS 2,919,365 12/1959 Butler et al. _____ 313—103
3,115,578 12/1963 Schulman _____ 250—71

RALPH G. NILSON, *Primary Examiner.*

S. ELBAUM, *Assistant Examiner.*